United States Patent [19]
Fukuoka et al.

[11] Patent Number: 5,539,470
[45] Date of Patent: Jul. 23, 1996

[54] IMAGE PROCESSING APPARATUS

[75] Inventors: Hiroyuki Fukuoka; Hiroyuki Takimoto; Taizo Hori, all of Kanagawa-ken; Takashi Kobayashi, Tokyo; Yoshihiro Nakatani, Kanagawa-ken; Jun Makino; Shinichi Koyama, both of Tokyo, all of Japan

[73] Assignee: Canon Kabushiki Kaisha, Tokyo, Japan

[21] Appl. No.: 301,485

[22] Filed: Sep. 7, 1994

[30] Foreign Application Priority Data

Sep. 14, 1993 [JP] Japan ..................... 5-228713

[51] Int. Cl.⁶ .......................... H04N 7/08; H04N 7/084; H04N 11/06; H04N 11/14
[52] U.S. Cl. .......................... 348/434; 348/445; 348/556; 358/320; 358/330
[58] Field of Search .......................... 348/434, 436, 348/433, 445, 556, 913; 358/330, 320, 337

[56] References Cited

U.S. PATENT DOCUMENTS

| | | | |
|---|---|---|---|
| 4,551,754 | 11/1985 | Meise et al. ............... | 348/434 |
| 4,855,811 | 8/1989 | Isnardi ..................... | 348/434 |
| 5,014,116 | 5/1991 | Kawai ...................... | 348/436 |

*Primary Examiner*—Scott A. Rogers
*Attorney, Agent, or Firm*—Robin, Blecker, Daley & Driscoll

[57] ABSTRACT

There is provided an image processing apparatus which comprises an inputting part for inputting an image signal, an attenuating part for attenuating a predetermined frequency portion of the image signal inputted by the inputting part, and a controlling part for controlling an attenuation characteristic of the attenuating part for attenuating the predetermined frequency portion, in accordance with a compression ratio of the image signal inputted by the inputting part. There is also provided an image processing apparatus which comprises an inputting part for inputting an image signal, an enhancing part for enhancing a high frequency band of the image signal inputted by the inputting part, and a controlling part for controlling a high-frequency-band enhancement characteristic of the enhancing part in accordance with a compression ratio of the image signal inputted by the inputting part. There is also provided an image processing apparatus which comprises an inputting part for inputting an image signal, a discriminating part for making a discrimination as to a particular attribute of the image signal inputted by the inputting part, a generating part for generating an attribute signal indicating that the image signal inputted by the inputting part represents an image having the particular attribute, in accordance with an output of the discriminating part, and a combining part for combining an output of the generating part with the image signal.

11 Claims, 12 Drawing Sheets

IMAGE PROCESSING APPARATUS

BACKGROUND OF THE INVENTION

1. Field of the Invention

The present invention relates to an image processing apparatus and, more particularly, to an image processing apparatus which is arranged to handle a plurality of kinds of image signals corresponding to different aspect ratios.

2. Description of the Related Art

In recent years, television sets or monitor displays having wide display screens have been proposed, and not only television sets or monitor displays having a conventional aspect ratio of 4:3 but also those having a wide-screen aspect ratio of 16:9 have been commercially available. In general, wide-screen television sets are arranged so that users can select a substantial display screen size corresponding to either of the 4:3 and 16:9 aspect ratios. Accordingly, the wide-screen television sets can cope with an image signal having either of the 4:3 and 16:9 aspect ratios.

An image recording and reproducing system suitable for use in such a wide-screen monitor display or television set has heretofore been put into practice. In the image recording and reproducing system, a wide-screen image signal is recorded as a laterally (horizontally) spatially compressed signal by a magnetic recording and reproducing apparatus for recording an image signal of 4:3 aspect ratio. During reproduction, the horizontally spatially compressed image signal is reproduced from the magnetic recording and reproducing apparatus and is visually displayed as a wide-screen image on a wide-screen monitor in such a way that the horizontal scanning width thereof is enlarged. In accordance with the above-described arrangement, since an image signal having a normal aspect ratio of 4:3 also can be recorded and reproduced, it is possible to realize an apparatus capable of coping with both a normal-screen image signal and a wide-screen image signal.

As is known, in a video tape recorder conforming to an 8-mm video system, since the lower sideband of the frequency-modulated luminance signal of an image signal to be recorded influences an audio frequency-modulated signal and a low-converted chrominance signal as noise, there is provided a trap circuit for attenuating frequency components corresponding to the audio frequency-modulated signal and the low-converted chrominance signal in the lower sideband.

Figure 1:
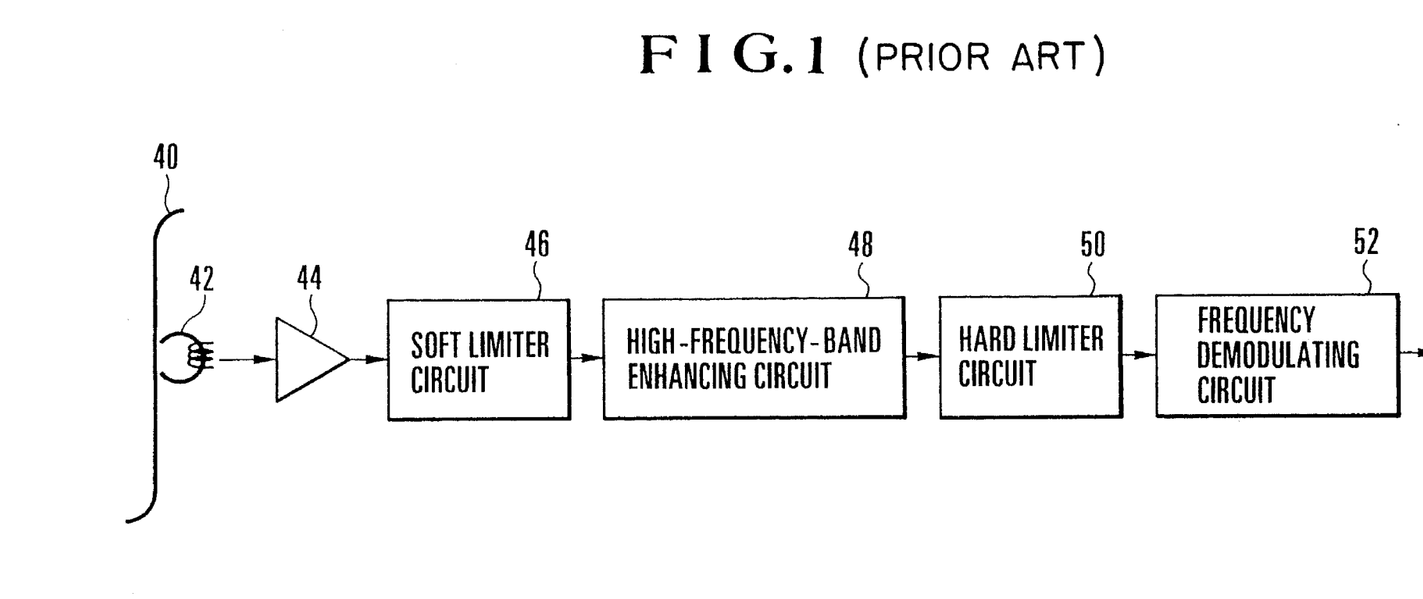
FIG. 1 is a schematic block diagram of a conventional reproducing circuit.
Figure 2A:
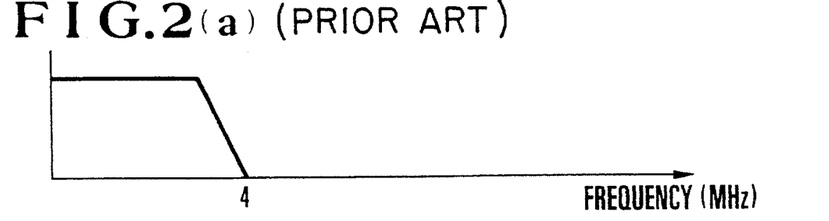
FIGS. 2(a) to 2(f) are explanatory views of frequency distributions resulting from the recording and reproduction of a normal-screen image signal (an image signal which is not horizontally compressed)
Figure 2B:
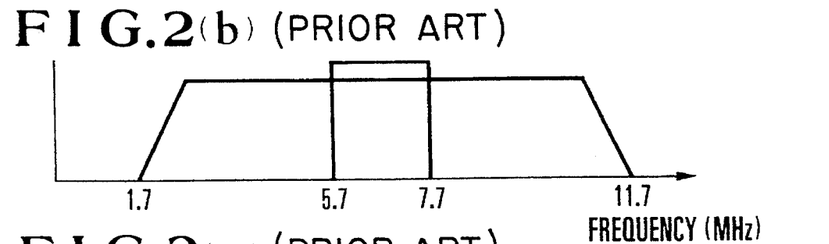

Conventionally, the circuit arrangement shown in FIG. 1, which has the effect of preventing an inverted white peak phenomenon from occurring in a reproduced image, is employed as a reproducing circuit for a magnetic recording and reproducing apparatus for frequency-modulating and recording an image signal (the luminance component thereof) on a magnetic tape in the manner used in, for example, the 8-mm video system. During recording, an image signal having a frequency distribution, such as that shown in FIG. 2(a), is converted into a signal having a frequency distribution, such as that shown in FIG. 2(b), by frequency modulation, and the thus-obtained signal is recorded on a magnetic tape.

Figure 2C:
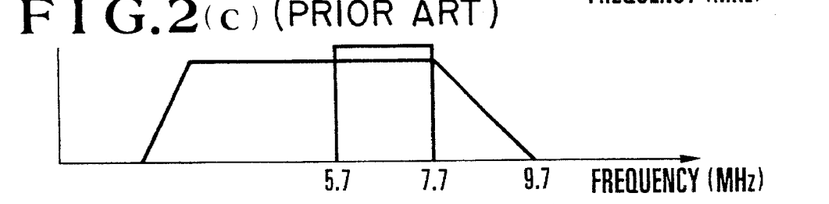

In the reproducing circuit shown in FIG. 1, the signal (particularly, the frequency-modulated signal) recorded on a magnetic tape 40 is converted into an electrical signal by a magnetic head 42, and the output of the magnetic head 42 is amplified to a predetermined level by a head amplifier 44. The head amplifier 44 outputs a signal the high frequency band of which is attenuated according to the frequency characteristics of the magnetic tape 40, as shown in FIG. 2(c).

Figure 2D:
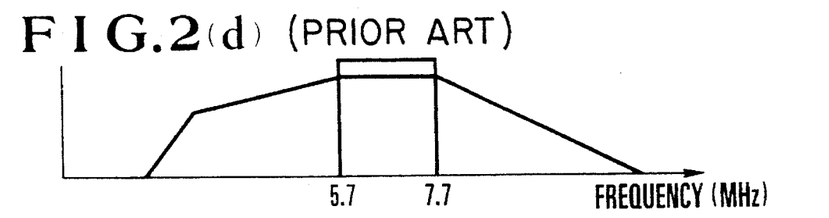

A soft limiter circuit 46 limits the amplitude of the output of the head amplifier 44 by approximately 10–12 dB, whereby a high frequency band component is restored as shown in FIG. 2(d). A high-frequency-band enhancing circuit 48, which has the amplification characteristic shown in FIG. 2(e), selectively enhances the high frequency band of the output of the soft limiter circuit 46. Thus, a reproduced signal is obtained in which the high frequency band is restored to the same level as the low frequency band, as shown in FIG. 2(f).

A hard limiter circuit 50 limits the amplitude of the output of the high-frequency-band enhancing circuit 48 by approximately 40–50 dB, and the output of the hard limiter circuit 50 is frequency-demodulated by a frequency demodulating circuit 52. Thus, the inverted white peak phenomenon is prevented.

Figure 3:
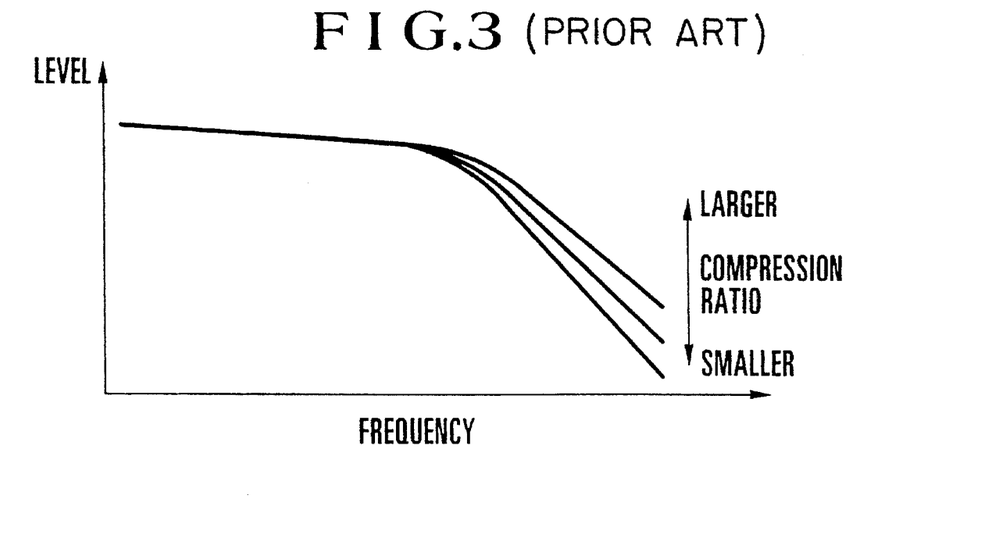
FIG. 3 is an explanatory view showing the energy distribution of the horizontally compressed image signal.
Figure 4:
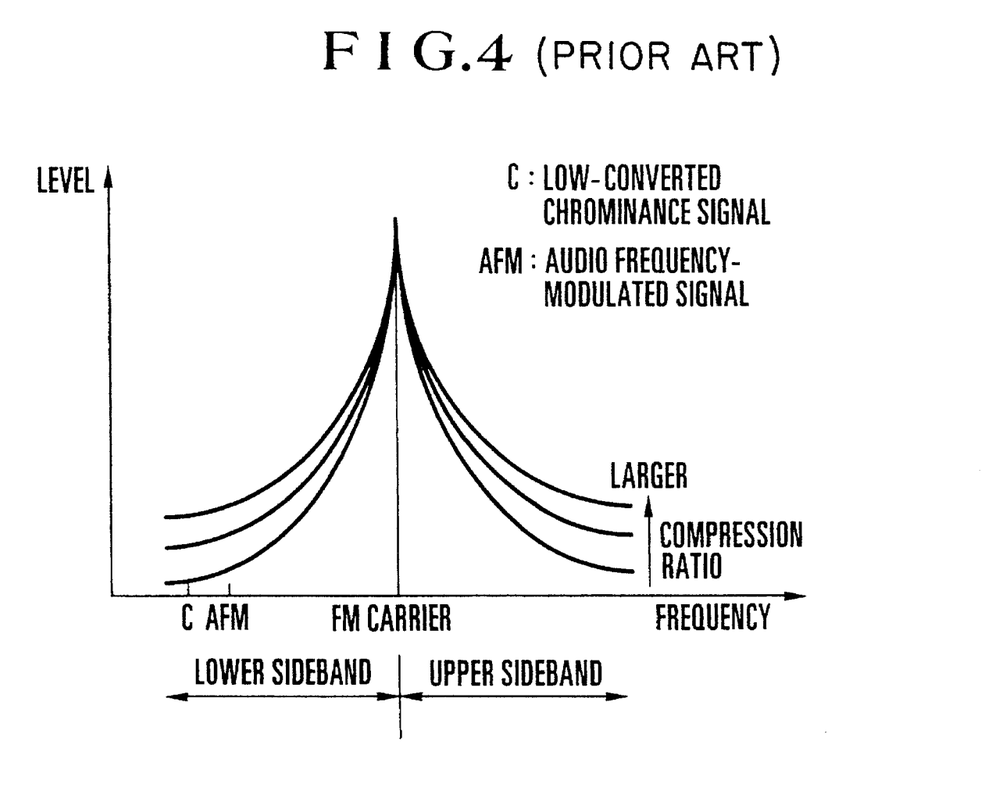
FIG. 4 is a frequency characteristic chart showing the frequency characteristic of a frequency-modulated signal with respect to a compression ratio.

A horizontally compressed image signal has an energy distribution in which the level of the image signal increases at high frequencies according to a compression ratio, as shown in FIG. 3. Accordingly, if the luminance signal of the horizontally compressed image signal is frequency-modulated, the energy components of the respective upper and lower sidebands increase as shown in FIG. 4, and the influence of the lower sideband on an audio frequency-modulated signal and a low-converted chrominance signal increases.

If the horizontally compressed wide-screen image signal is reproduced by the reproducing circuit shown in FIG. 1, it is impossible to achieve a satisfactory reproduction image quality; specifically, a high frequency band runs short compared to a low frequency band. This is because the recorded signal contains larger amounts of high-frequency-band components than a normal-screen image signal and, therefore, the wide-screen image signal differs from the normal-screen image signal in frequency distribution.

Figure 2E:
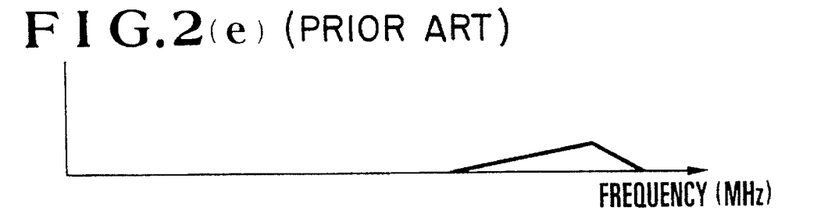
Figure 2F:
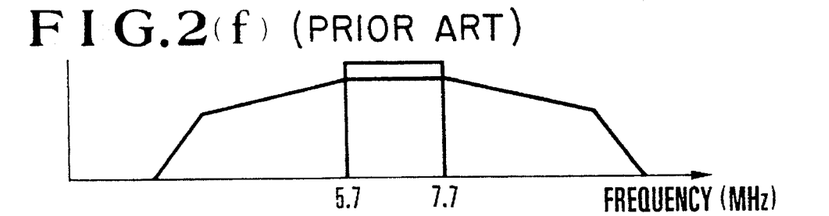
Figure 5A:
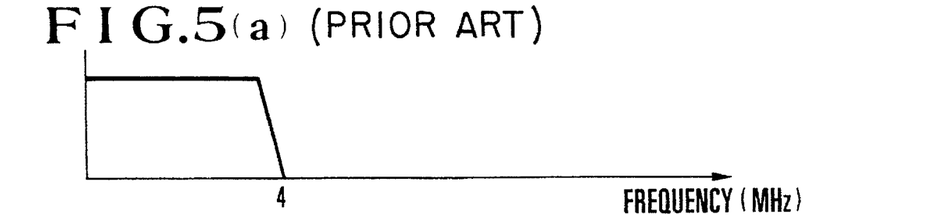
FIGS. 5(a) to 5(f) are explanatory views of frequency distributions resulting from the processing of the horizontally compressed image signal by a related-art recording and reproducing apparatus.
Figure 5B:
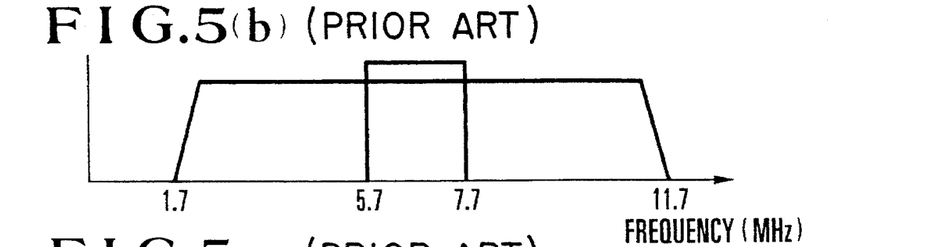
Figure 5C:
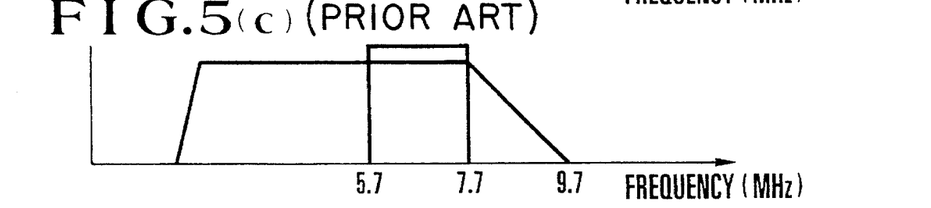
Figure 5D:
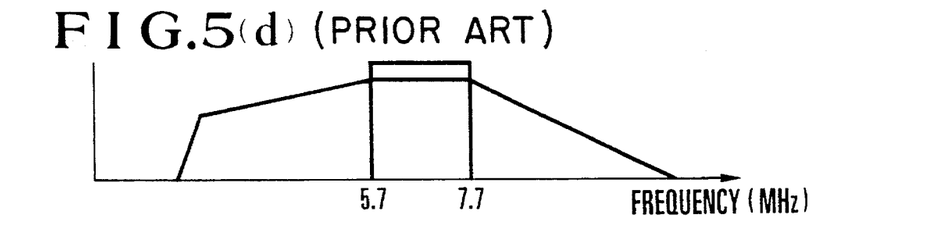
Figure 5E:
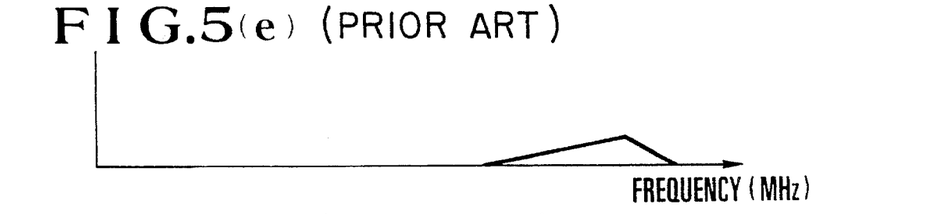
Figure 5F:
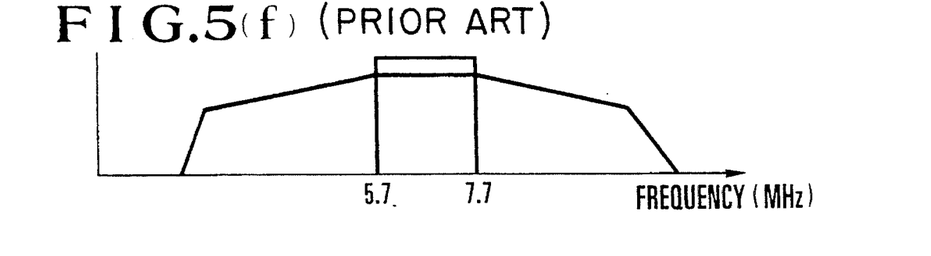

FIGS. 5(a) to 5(f) are views similar to FIGS. 2(a) to 2(f), but shows the characteristics of the wide-screen image signal. If a wide-screen image signal having large amounts of high-frequency components as shown in FIG. 5(a) is to be recorded or reproduced, the high-frequency-band enhancing circuit 48 for the normal-screen image signal, which has the characteristic shown in FIG. 2(e), is employed. As a result, a signal in which the high frequency band runs short compared to the low frequency band as shown in FIG. 5(f) is formed, so that it is impossible to achieve a satisfactory effect of preventing an inverted white peak phenomenon.

As is also known, in the case of the conventional image recording and reproducing apparatus, if both a normal-screen image signal (an image signal which is not horizontally compressed) and a wide-screen image signal (an image signal which is horizontally compressed) are recorded on one magnetic tape, an operator needs to determine whether an image signal which is being reproduced is the normal-screen image signal or the wide-screen image signal, on the basis of the shape of an image which is visually displayed. If a subject having a well-known shape is displayed, the operator can easily make such a decision. However, if a subject having an unknown shape is displayed, it is difficult for the operator to discriminate between the normal-screen image signal and the wide-screen image signal.

Figure 6:
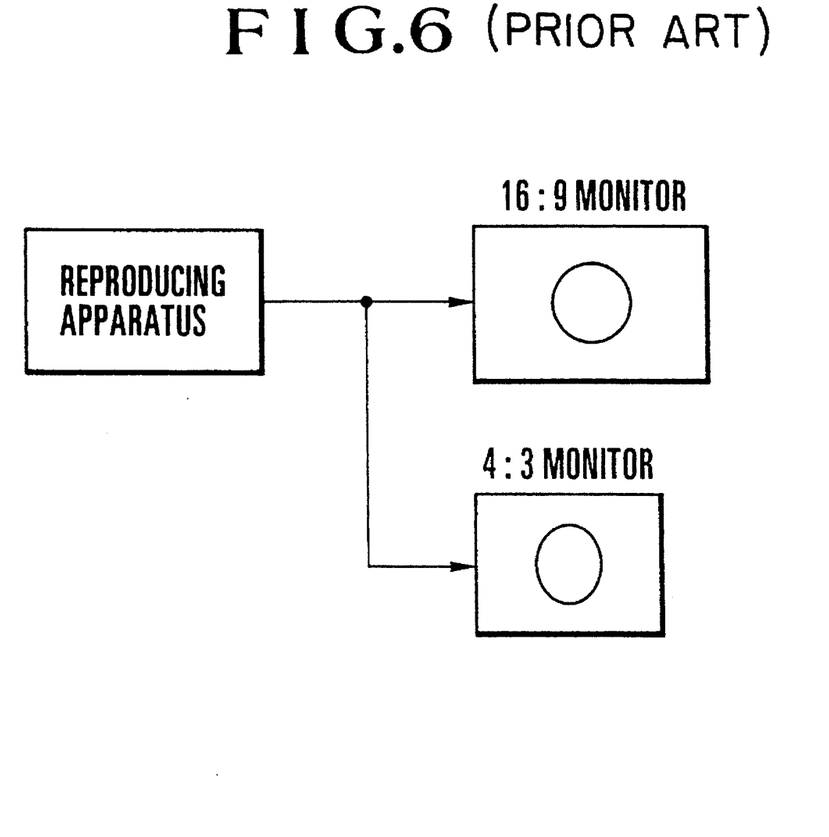
FIG. 6 is a schematic view of a related-art image display example.

For example, if a perfectly round subject is reproduced as a wide-screen image signal, it is displayed as a perfect circle on a wide-screen monitor having an aspect ratio of 16:9, as shown in FIG. 6. However, in the case of a normal-screen monitor having an aspect ratio of 4:3, the subject is displayed as an ellipse which is vertically extended. In this case, an operator who knows that the original subject is perfectly round can easily determine that it is preferable to display the reproduced image on a screen of 16:9 aspect ratio. However, an operator who does not know that the original subject is round or elliptical can not determine which monitor screen is preferable.

Figure 7:
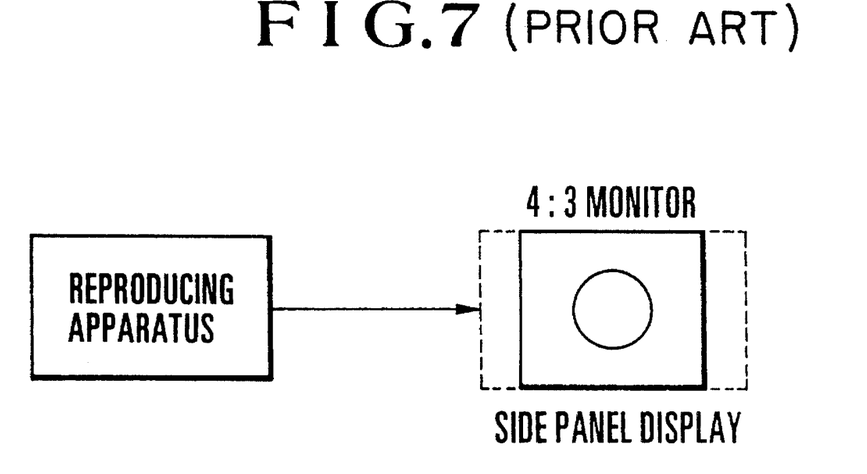
FIG. 7 is a schematic view of an image display example based on a conventional side panel display.

Further, if the horizontal ratio of the image is adjusted in a reproducing apparatus and the subject is displayed at a correct ratio with the right and left portions of the image omitted as shown in FIG. 7 (side panel display), since the subject itself is displayed at a correct ratio, an operator does not have a sense of incompatibility and cannot know that the right and left portions of the image are omitted. For this reason, in an arrangement in which the right and left display positions can be adjusted (panning) according to the subject, it may be impossible to utilize such function.

SUMMARY OF THE INVENTION

It is, therefore, an object of the present invention to provide an image processing apparatus capable of optimally attenuating a predetermined frequency portion of a spatially compressed image signal to prevent an influence on another signal.

To achieve the above object, in accordance with one aspect of the present invention, there is provided an image processing apparatus which comprises inputting means for inputting an image signal, attenuating means for attenuating a predetermined frequency portion of the image signal inputted by the inputting means, and controlling means for controlling an attenuation characteristic of the attenuating means for attenuating the predetermined frequency portion, in accordance with a compression ratio of the image signal inputted by the inputting means.

Another object of the present invention is to provide an image processing apparatus capable of optimally effecting high-frequency-band enhancement processing of a spatially compressed image signal to provide a high-quality image.

To achieve the above object, in accordance with another aspect of the present invention, there is provided an image processing apparatus which comprises inputting means for inputting an image signal, enhancing means for enhancing a high frequency band of the image signal inputted by the inputting means, and controlling means for controlling a high-frequency-band enhancement characteristic of the enhancing means in accordance with a compression ratio of the image signal inputted by the inputting means.

Another object of the present invention is to provide an image processing apparatus which makes it possible to easily determine whether a displayed image is a spatially compressed image.

To achieve the above object, in accordance with another aspect of the present invention, there is provided an image processing apparatus which comprises inputting means for inputting an image signal, discriminating means for making a discrimination as to a particular attribute of the image signal inputted by the inputting means, generating means for generating an attribute signal indicating that the image signal inputted by the inputting means represents an image having the particular attribute, in accordance with an output of the discriminating means, and combining means for combining an output of the generating means with the image signal.

Other objects, features and advantages of the invention will become apparent from the following detailed description taken in conjunction with the accompanying drawings.

DETAILED DESCRIPTION OF THE PREFERRED EMBODIMENTS:

Embodiments of the present invention will be described below with reference to the accompanying drawings.

Figure 8:
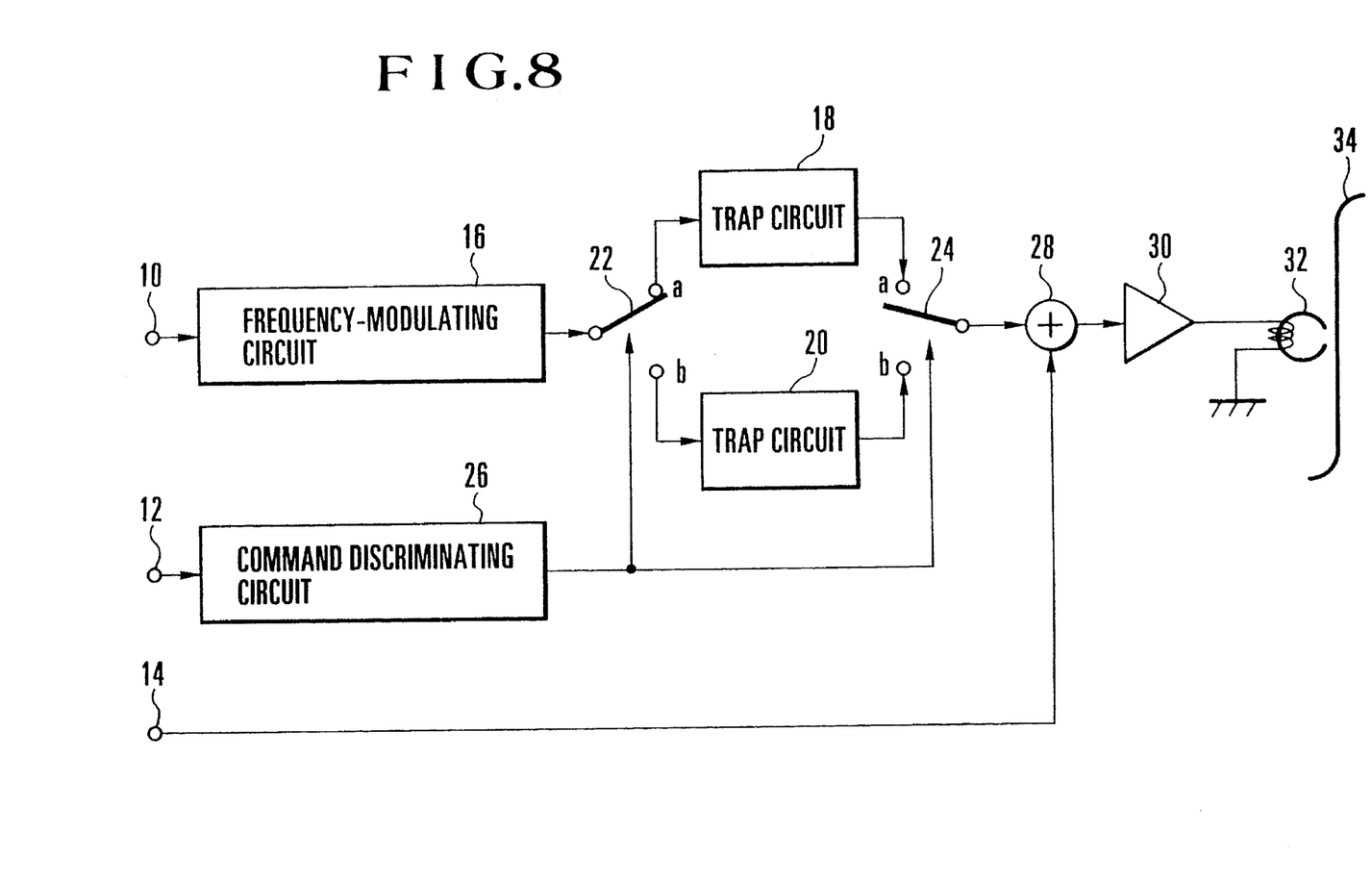
FIG. 8 is a block diagram of the arrangement of an image recording apparatus according to one embodiment of the present invention.

FIG. 8 is a block diagram showing the arrangement of an image recording apparatus according to one embodiment of the present invention. The arrangement shown in FIG. 8 includes an input terminal 10 through which to input the luminance component of an image signal to be recorded, an input terminal 12 through which to input a command indicative of a compression ratio, an input terminal 14 through which to input a low-converted chrominance signal and an audio frequency-modulated signal, and a frequency-modulating circuit 16 for frequency-modulating the luminance signal supplied from the input terminal 10.

Figure 9:
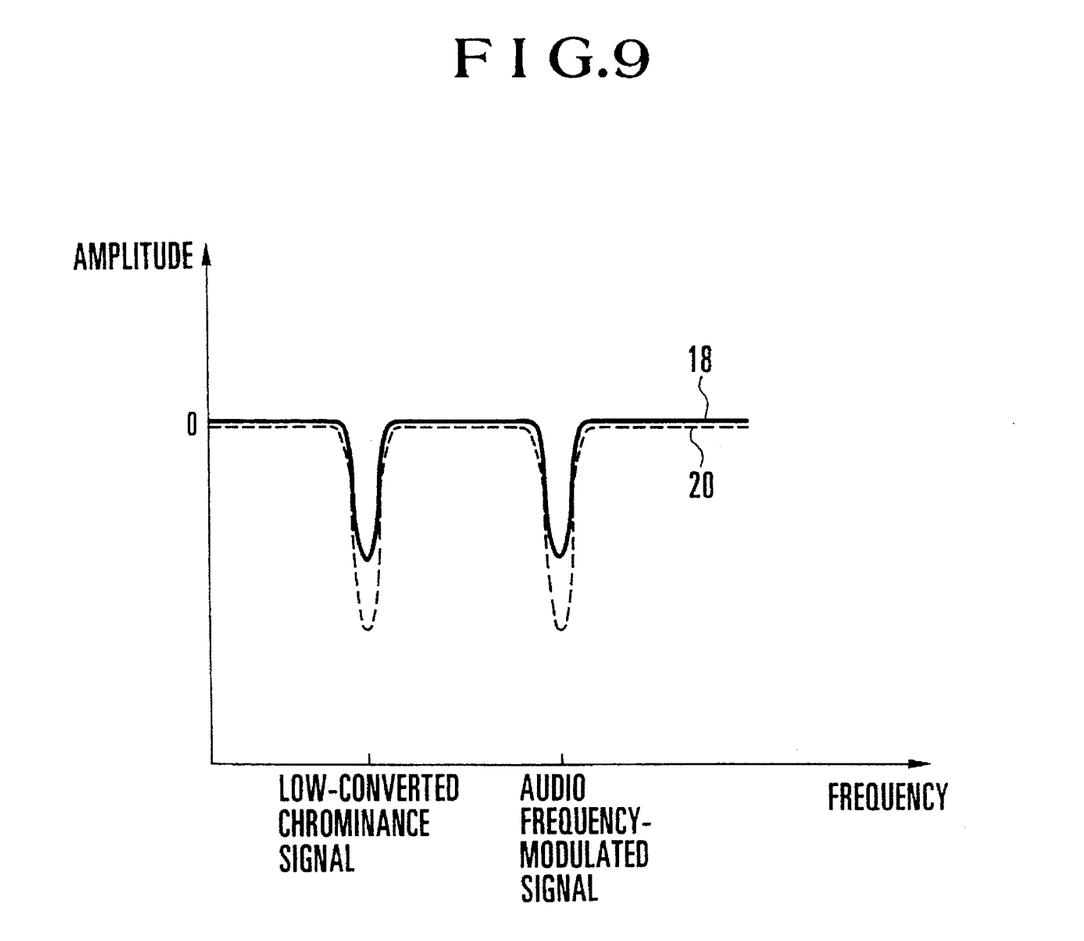
FIG. 9 is a characteristic chart of the trap circuits 18 and 20 shown in FIG. 8.

The shown arrangement also includes trap circuits 18 and 20 for attenuating frequency components corresponding to the low-converted chrominance signal and the audio frequency-modulated signal in the lower sideband of the frequency-modulated luminance signal. The characteristics of the respective trap circuits 18 and 20 are shown in FIG. 9. As shown in FIG. 9, the attenuation ratio of the trap circuit 20 for the frequency components corresponding to the low-converted chrominance signal and the audio frequency-modulated signal is set to be greater than that of the trap circuit 18.

The shown arrangement also includes switches 22 and 24 for selecting the trap circuit 18 or 20. The switch 22 supplies the output of the frequency-modulating circuit 16 to the trap circuit 18 or 20, and the switch 24 selects the output of the trap circuit 18 or 20 selected by the switch 22. The shown arrangement also includes a command discriminating circuit 26 for making a discrimination as to a command indicative of a compression ratio which is inputted through the input terminal 12, and controlling the switches 22 and 24 in accordance with the command.

The shown arrangement also includes an adder 28 for multiplexing the low-converted chrominance signal and the audio frequency-modulated signal supplied from the input terminal 14 onto the output signal of the trap circuit 18 or 20 selected by the switch 24, an amplifier 30 for amplifying the output of the adder 28, and a magnetic head 32 for recording the output of the amplifier 30 on a magnetic tape 34.

The operation of the arrangement shown in FIG. 8 will be described below. The frequency-modulating circuit 16 frequency-modulates a luminance signal supplied from the input terminal 10, and outputs the frequency-modulated luminance signal to the switch 22. A command indicative of a compression ratio (for example, information indicating whether an image signal to be recorded is horizontally spatially compressed) is inputted through the input terminal 12, and the command discriminating circuit 26 makes a discrimination as to the command and controls the switches 22 and 24 in accordance with the command. Specifically, if an image signal to be recorded is horizontally compressed, the command discriminating circuit 26 causes the switches 22 and 24 to select the trap circuit 20; otherwise, the command discriminating circuit 26 causes the switches 22 and 24 to select the trap circuit 18.

Thus, in the case of a horizontally compressed image signal, the trap circuit 20 greatly attenuates frequency portions corresponding to the low-converted chrominance signal and the audio frequency-modulated signal in the lower sideband of the frequency-modulated luminance signal of the horizontally compressed image signal. On the other hand, in the case of a normal-screen image signal which is not horizontally compressed, the trap circuit 18 normally attenuates frequency portions corresponding to the low-converted chrominance signal and the audio frequency-modulated signal in the lower sideband of the frequency-modulated luminance signal of the normal-screen image signal.

The adder 28 adds the low-converted chrominance signal and the audio frequency-modulated signal supplied from the input terminal 14 to the frequency-modulated luminance signal which has passed through the trap circuit 18 or 20.

The output of the adder 28 is amplified to a predetermined level by the amplifier 30 and recorded on the magnetic tape 34 by the magnetic head 32.

For ease of understanding, the above-described embodiment adopts the arrangement capable of selecting either one of the two trap circuits 18 and 20 in accordance with whether an image signal to be recorded is a normal-screen image signal or a wide-screen image signal (i.e., a horizontally compressed image signal). However, it is also possible to adopt an arrangement which uses one trap circuit for varying an attenuation ratio for frequency components corresponding to a low-converted chrominance signal and an audio frequency-modulated signal. It is also apparent that such an attenuation ratio may be varied continuously or stepwise according to the magnitude of a compression ratio.

Figure 10:
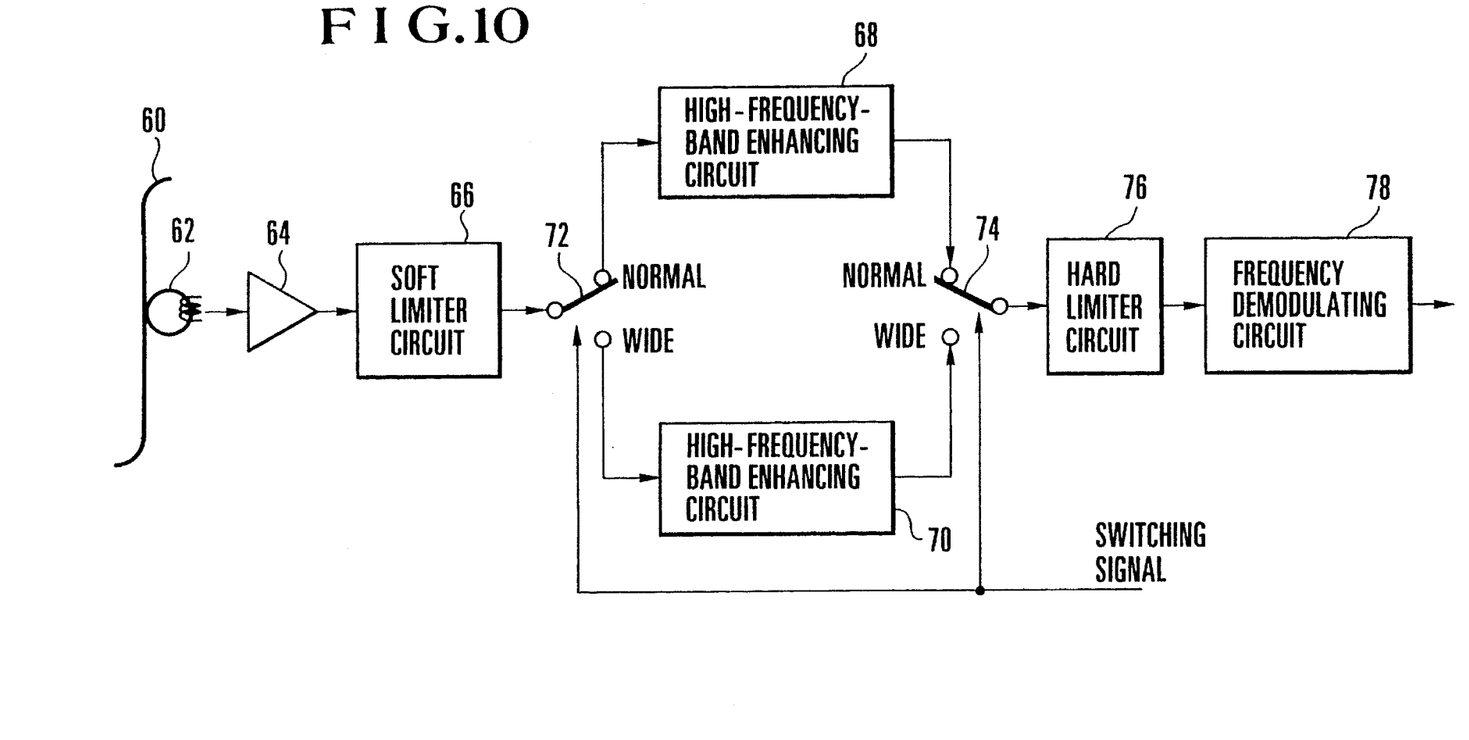
FIG. 10 is a block diagram showing the arrangement of an image reproducing apparatus according to another embodiment of the present invention.

FIG. 10 is a block diagram showing the arrangement of an image reproducing apparatus according to another embodiment of the present invention. The arrangement shown in FIG. 10 includes a magnetic head 62 for converting a signal recorded on a magnetic tape 60 into an electrical signal, a head amplifier 64 for amplifying the output of the magnetic head 62, and a soft limiter circuit 66 for limiting the amplitude of the output of the head amplifier 64 by approximately 10–12 dB.

The arrangement shown in FIG. 10 also includes a high-frequency-band enhancing circuit 68 for a normal-screen image signal, and a high-frequency-band enhancing circuit 70 for a wide-screen image signal. The high-frequency-band enhancing circuit 68 has the frequency characteristic shown by a solid line in FIG. 11(e), whereas the high-frequency-band enhancing circuit 70 has the frequency characteristic shown by a dashed line in FIG. 11(e). The shown arrangement also includes a selecting switch 72 for selectively supplying the output of the soft limiter circuit 66 to the high-frequency-band enhancing circuit 68 or 70, and a selecting switch 74 for selecting the output of the high-frequency-band enhancing circuit 68 or 70 in interlocking relation to the selecting switch 72. Each of the selecting switches 72 and 74 selects the high-frequency-band enhancing circuit 68 in the case of a normal-screen image signal or the high-frequency-band enhancing circuit 70 in the case of a wide-screen image signal.

The shown arrangement also includes a hard limiter circuit 76 for limiting the amplitude of the output of the selecting switch 74 by approximately 40–50 dB, and a frequency-demodulating circuit 78 for frequency-demodulating the output of the hard limiter circuit 76.

Figure 11A:
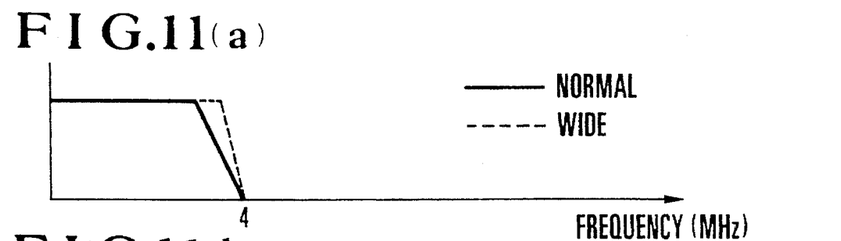
FIGS. 11(a) to 11(f) are explanatory views of the frequency distributions of a normal-screen image signal (an image signal which is not horizontally compressed) and a wide-screen image signal (an image signal which is horizontally compressed) which are obtained from processing by the apparatus shown in FIG. 10.
Figure 11B:
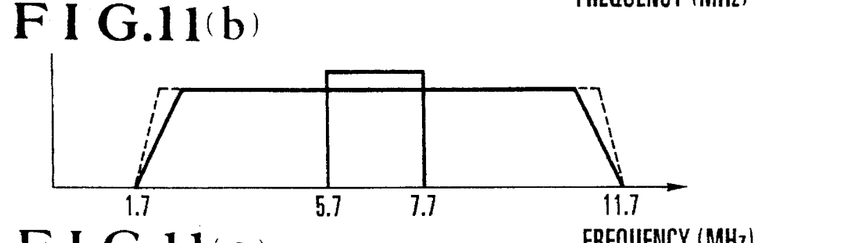
Figure 11C:
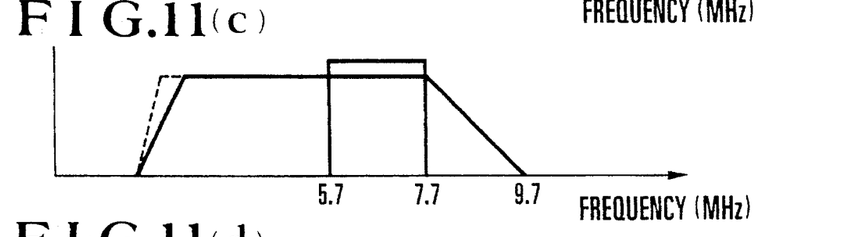
Figure 11D:
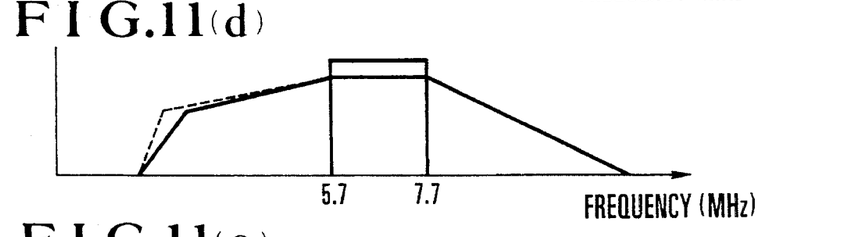
Figure 11E:
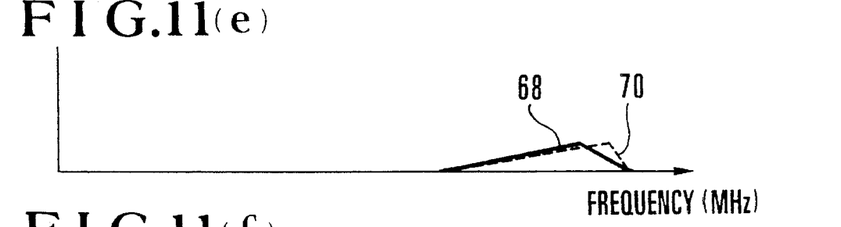
Figure 11F:
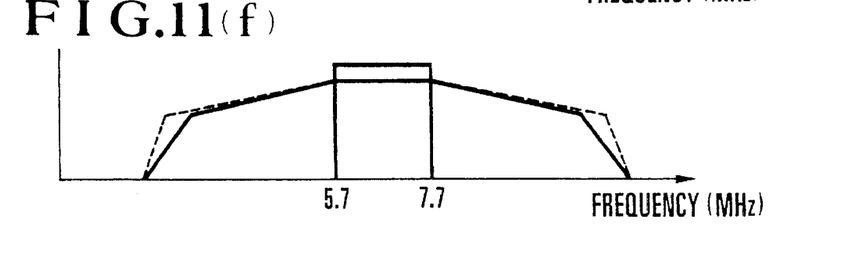

The operation of the circuit shown in FIG. 10 will be described below with reference to FIGS. 11(a) to 11(f). In each of FIGS. 11(a) to 11(f), a solid line represents a normal-screen image signal (an image signal which is not horizontally compressed), while a dashed line represents a wide-screen image signal (an image signal which is horizontally compressed). FIG. 11(a) shows the frequency distribution of an image signal before recording. When the image signal having the frequency distribution shown in FIG. 11(a) is frequency-modulated for the purpose of recording, an image signal having the frequency distribution shown in FIG. 11(b) is formed. The image signal shown in FIG. 11(b) is recorded on the magnetic tape 60.

In the circuit shown in FIG. 10, the magnetic head 62 electromagnetically converts a signal recorded on the magnetic tape 60 into an electrical signal, and the output of the magnetic head 62 is amplified by the head amplifier 64. The head amplifier 64 outputs a signal the high frequency band of which is attenuated as shown in FIG. 11(c) according to the frequency characteristic of the magnetic tape 60. The soft limiter circuit 66 limits the magnitude of the output of the head amplifier 64 by approximately 10–12 dB, thereby restoring the high frequency band as shown in FIG. 11(d).

The selecting switches 72 and 74 select the high-frequency-band enhancing circuit 68 in the case of a normal-screen image signal or the high-frequency-band enhancing circuit 70 in the case of a wide-screen image signal. Thus, the high frequency band of the normal-screen image signal is enhanced as shown by the solid line in FIG. 11(f); otherwise, the high frequency band of the wide-screen image signal is enhanced as shown by the dashed line in FIG. 11(f). Thus, it is possible to applying an optimum high-frequency-band enhancement to each of the normal-screen image signal and the wide-screen image signal.

The hard limiter circuit 76 limits the amplitude of the output of the selecting switch 74 by approximately 40–50 dB, and the output of the hard limiter circuit 76 is frequency-demodulated by the frequency-demodulating circuit 78.

Figure 12:
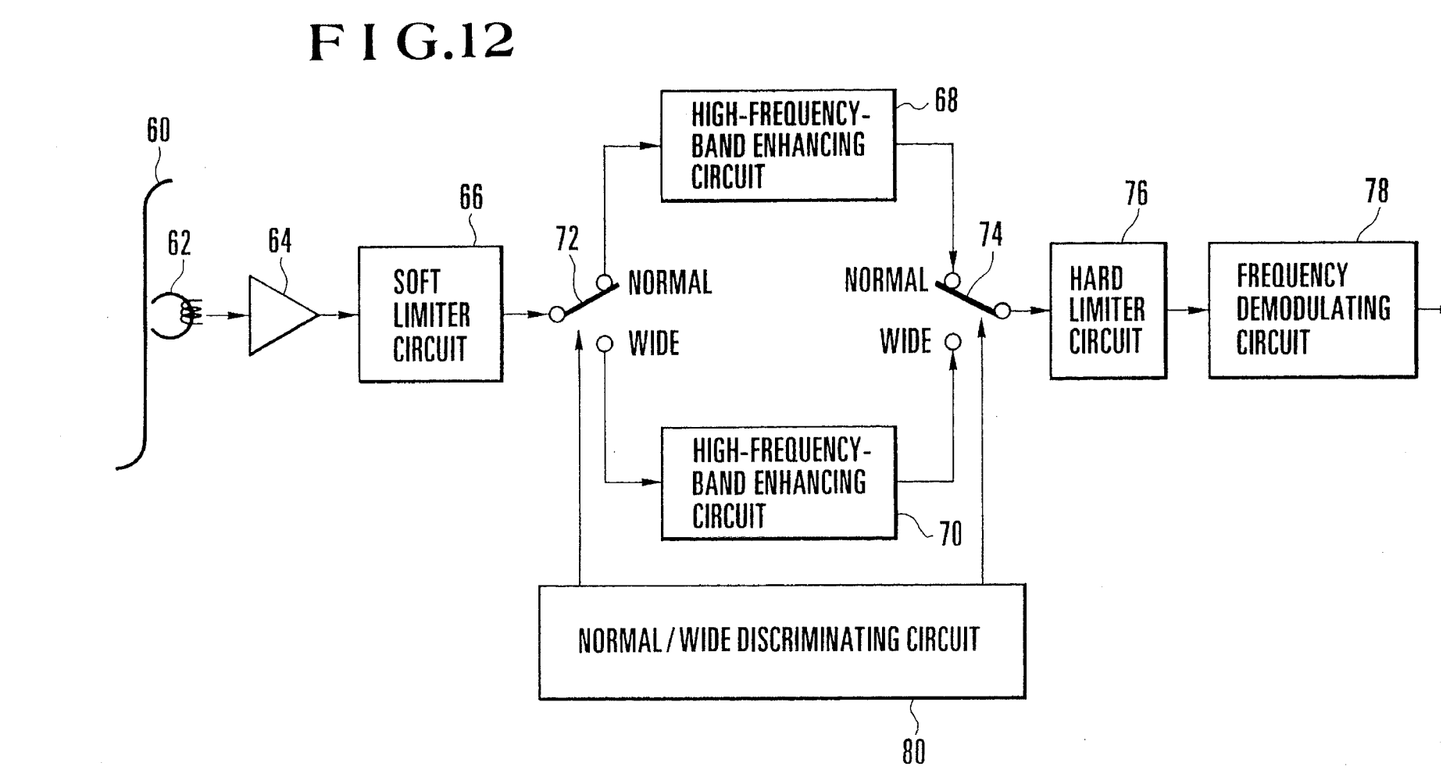
FIG. 12 is a block diagram of the arrangement of a modification of the embodiment shown in FIG. 10.

FIG. 12 is a block diagram showing the arrangement of a modification of the embodiment shown in FIG. 10. In FIG. 12, identical reference numerals are used to denote constituent elements substantially identical to those shown in FIG. 10. The arrangement shown in FIG. 12 further includes a normal/wide discriminating circuit 80 for determining whether a signal reproduced from the magnetic tape 60 is a normal-screen image signal (an image signal which is not horizontally compressed) or a wide-screen image signal (an image signal which is horizontally compressed). The selecting switches 72 and 74 are automatically switched in accordance with the result of the decision. Such discrimination between the normal-screen image signal and the wide-screen image signal is made by utilizing, for example, a discrimination pin provided on a video cassette (not shown) or a video code added to a video signal.

Figure 13:
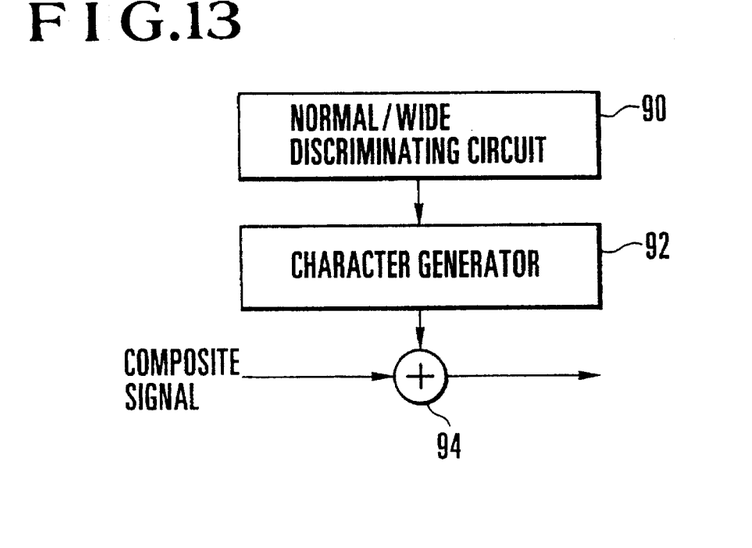
FIG. 13 is a block diagram of the arrangement of a device for combining a visual display indicative of the reproduction of a wide-screen image signal with a reproduced image, according to another embodiment of the present invention.

Another embodiment of the present invention which makes it possible to easily determine which is being reproduced, the normal-screen image signal (or image signal which is not horizontally compressed) or the wide-screen image signal (or image signal which is horizontally compressed), will be described below with reference to FIG. 13. FIG. 13 is a schematic block diagram showing the arrangement of a basic portion for making such a decision.

Referring to FIG. 13, a circuit 90 is a normal/wide discriminating circuit for discriminating between a normal-screen image signal and a wide-screen image signal. The normal/wide discriminating circuit 90 discriminates between the normal-screen image signal and the wide-screen image signal by utilizing, for example, a discrimination pin provided on a video cassette (not shown) or a video code added to a video signal. If the discrimination result provided by the normal/wide discriminating circuit 90 indicates a wide-screen image signal, a character generator 92 generates a visual display indicative of the wide-screen image signal (the "WIDE" display). An adder 94 superimposes the output of the character generator 92 on a composite signal indicative of a reproduced image, and the output of the adder 94 is outputted from a composite output terminal through which to output a luminance component and a chrominance component as a composite signal.

Figures 14A, 14B:
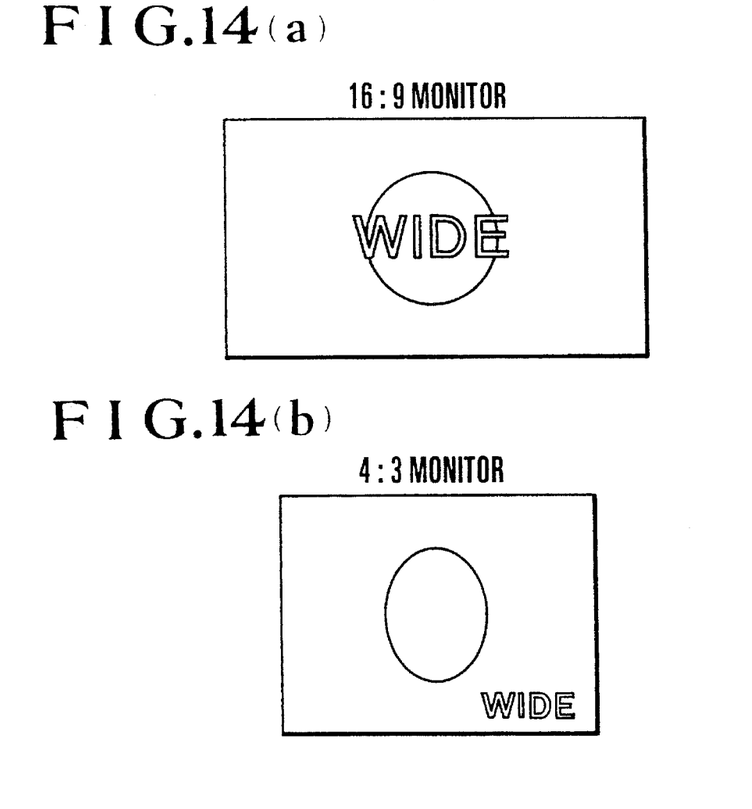
FIGS. 14(a) and 14(b) are views showing one example of a display screen according to the embodiment of FIG. 13.

FIGS. 14(a) and 14(b) show different examples of an output image according to the present embodiment. FIG. 14(a) shows an image displayed on a wide-screen monitor, while FIG. 14(b) shows an image displayed on a normal-screen monitor, and each of FIGS. 14(a) and 14(b) show a case in which a reproduced wide-screen image is displayed.

The outlined characters "WIDE" are the image generated from the character generator 92. A position where the characters "WIDE" are to be displayed, i.e., a position where they are to be superimposed on the composite signal by the adder 94, may be the center of the screen as shown in FIG. 14(a) or the bottom right corner of the screen as shown in FIG. 14(b) so as not to hinder the display of the reproduced wide-screen image.

Figure 15:
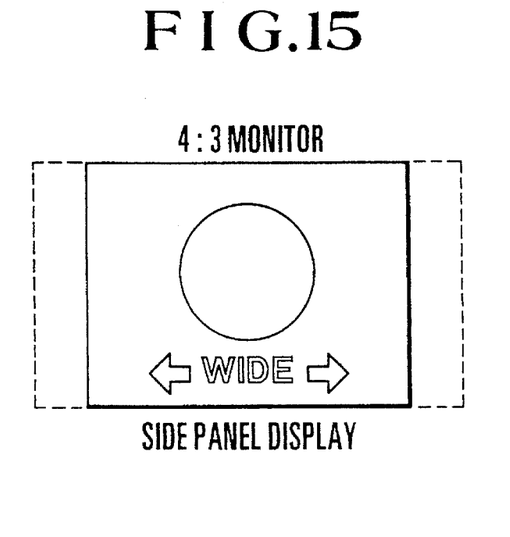
FIG. 15 is a view showing another example of the display screen according to the embodiment of FIG. 13.

If a side panel display is selected in a reproducing apparatus, arrows or the like may be added on the opposite sides of the characters "WIDE" to indicate the actually displayed portion of the entire image area, as shown in FIG. 15.

Figure 16:
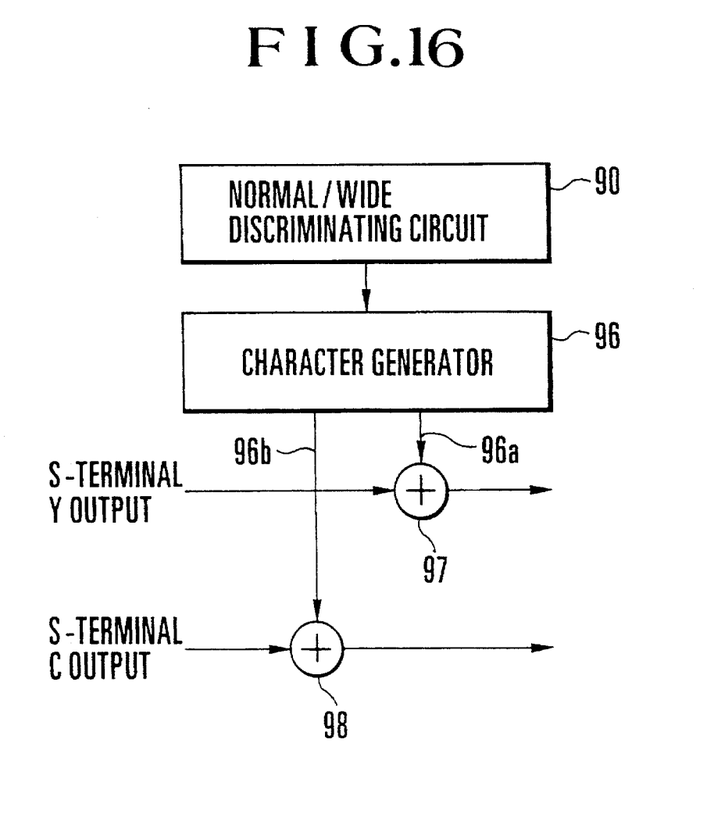
FIG. 16 is a block diagram showing the arrangement of an embodiment in which an S terminal is incorporated into the embodiment shown in FIG. 13.

FIG. 16 is a circuit block diagram of an embodiment for outputting a wide-screen image signal on which the "WIDE" display is superimposed, through a demultiplex output terminal through which to output a luminance signal and a chrominance signal in demultiplexed form. In accordance with the discrimination result provided by the normal/wide discriminating circuit 90, a character generator 96 generates a "WIDE" display signal 96a to be superimposed on a luminance signal and a "WIDE" display signal 96b to be superimposed on a chrominance signal. An adder 97 superimposes the "WIDE" display signal 96a on the luminance signal of a reproduced signal, while an adder 98 superimposes the "WIDE" display signal 96b on the chrominance signal of the reproduced signal. The outputs of the adders 97 and 98 are outputted from a so-called S terminal.

Incidentally, a timer circuit may be added to each of the circuits shown in FIGS. 13 and 16 so that the "WIDE" display can be turned off when a predetermined time elapses.

In accordance with the above-described embodiments, since a visual display indicative of a wide-screen image signal is combined with a reproduced wide-screen image itself, even if a video selector is employed, an operator can easily determine whether a wide-screen image is displayed on a monitor screen.

As is readily understood from the foregoing description, in accordance with the above-described embodiments, since a trap level for a frequency-modulated luminance signal is varied according to compression information about an image signal to be recorded, it is possible to reduce adverse influences on a chrominance signal and an audio signal.

In the image reproducing apparatus according to the present embodiments, since the frequency characteristics of high-frequency-band enhancement for reproduction are selectively used according to the kind of reproduced image, it is possible to achieve a satisfactory image quality even in the case of either of normal-screen and wide-screen images.

In the image reproducing apparatus according to the present embodiments, if a reproduced image to be displayed is a wide-screen image, it is determined whether the image is an image having a particular attribute, so that an attribute based on the result of the decision is visually displayed on a displayed image. Accordingly, for example, an operator can easily determine whether an image which is presently displayed is a normal-screen image or a wide-screen image.

It is to be noted that the present invention may be practiced in still other ways without departing from the spirit or essential features of the present invention.

For example, it is of course possible to incorporate a combination of ones suitably selected from the arts described above as the respective embodiments into an image processing apparatus such as an image recording/reproducing apparatus.

In this arrangement, the command discriminating circuit 26 of FIG. 8, the normal/wide discriminating circuit 80 of FIG. 12, the normal/wide discriminating circuit 90 of FIGS. 13 and 16 may be formed as one common circuit.

In other words, the foregoing description of embodiments has been given for illustrative purposes only and is not to be construed as imposing any limitation in every respect. The scope of the invention is, therefore, to be determined solely by the following claims and not limited by the text of the specifications, and alterations made within a scope equivalent to the scope of the claims fall within the true spirit and scope of the invention.

What is claimed is:

1. An image processing apparatus comprising:

a) inputting means for inputting an image signal;

b) attenuating means for attenuating a predetermined frequency portion of the image signal inputted by said inputting means; and c) controlling means for controlling an attenuation characteristic of said attenuating means for attenuating the predetermined frequency portion, in accordance with a compression ratio of the image signal inputted by said inputting means.

2. An image processing apparatus according to claim 1, further comprising modulating means for frequency-modulating the image signal inputted by said inputting means, said attenuating means being arranged to attenuate the predetermined frequency portion of a lower sideband of a wave modulated by said modulating means.

3. An image processing apparatus according to claim 1, wherein the image signal is a signal which is horizontally compressed.

4. An image processing apparatus according to claim 3, wherein said controlling means has detecting means for detecting a horizontal compression ratio of the image signal.

5. An image processing apparatus according to claim 1, further comprising recording means for recording the image signal attenuated by said attenuating means on a recording medium.

6. An image processing apparatus according to claim 5, further comprising reproducing means for reproducing the image signal recorded on the recording medium.

7. An image processing apparatus according to claim 6, wherein said reproducing means includes enhancing means for enhancing a high frequency band of the image signal reproduced from the recording medium and controlling means for controlling said enhancing means in accordance with the compression ratio of the image signal.

8. An image processing apparatus according to claim 6, wherein said reproducing means includes discriminating means for determining whether the image signal reproduced by said reproducing means represents an image having a particular attribute, generating means for generating, according to an output of said discriminating means, a character signal indicating that the image signal represents the image having the particular attribute, and combining means for combining an output of said generating means with the image signal.

9. An image processing apparatus according to claim 8, wherein the image having the particular attribute is an image which is horizontally linearly compressed.

10. An image processing apparatus according to claim 8, further comprising an output terminal through which to output the image signal reproduced by said reproducing means, as a luminance component signal and a chrominance component signal demultiplexed from the image signal, said combining means being arranged to combine the character signal with each of the demultiplexed luminance and chrominance component signals.

11. An image processing apparatus according to claim 8, further comprising an output terminal through which to output as a composite signal the image signal reproduced by said reproducing means, said combining means being arranged to combine the character signal with the composite signal.

* * * * *